US006964355B2

(12) United States Patent
Landau

(10) Patent No.: US 6,964,355 B2
(45) Date of Patent: Nov. 15, 2005

(54) DRY FOOD DISPENSING SYSTEM

(75) Inventor: Ofer Landau, Even Yehudah (IL)

(73) Assignees: Gil Gold, Ramleh (IL); Tamir Levy, Ramleh (IL)

(*) Notice: Subject to any disclaimer, the term of this patent is extended or adjusted under 35 U.S.C. 154(b) by 0 days.

(21) Appl. No.: 10/178,512

(22) Filed: Jun. 25, 2002

(65) Prior Publication Data

US 2003/0234264 A1 Dec. 25, 2003

(51) Int. Cl.[7] .................................................. G01F 11/24
(52) U.S. Cl. .................... 222/185.1; 222/367; 222/368
(58) Field of Search ................................ 222/367, 368, 222/185.1

(56) References Cited

U.S. PATENT DOCUMENTS

| | | | | | |
|---|---|---|---|---|---|
| 852,603 | A | * | 5/1907 | Hanlon | 222/368 |
| 1,022,774 | A | * | 4/1912 | Julio | 222/368 |
| 2,475,381 | A | * | 7/1949 | Erickson | 222/368 |
| 2,575,967 | A | * | 11/1951 | May | 222/368 |
| 2,920,796 | A | * | 1/1960 | Field | 222/368 |
| 3,033,164 | A | * | 5/1962 | Evers | 119/54 |
| 3,169,675 | A | * | 2/1965 | Gutzmann et al. | 222/368 |
| 4,511,067 | A | * | 4/1985 | Martin et al. | 222/368 |
| 4,957,219 | A | * | 9/1990 | Robbins et al. | 222/368 |
| 5,052,288 | A | * | 10/1991 | Marquez et al. | 222/368 |
| 5,303,672 | A | * | 4/1994 | Morris | 222/368 |
| 5,927,558 | A | * | 7/1999 | Bruce | 222/368 |
| 6,029,828 | A | * | 2/2000 | Robbins et al. | 211/78 |

* cited by examiner

*Primary Examiner*—Kenneth Bomberg
(74) *Attorney, Agent, or Firm*—Edward Langer; Shiboleth, Yisraeli, Roberts, Zisman & Co.

(57) ABSTRACT

A hermetically sealable dispenser for measuring and dispensing predetermined amounts of a granular product without breakage of the product. The dispenser comprises a container which can be filled with the product, and a flexible, rotatable, paddle wheel fixed within the container. The spacing between paddles of the paddle wheel form measuring compartments. The dimensions of the paddle wheel are such that the wheel forms a hermetic seal near one end of the container. A lid is provided to seal the upper end of the container such that the product is stored in an air-tight compartment prior to dispensing.

8 Claims, 4 Drawing Sheets

DRY FOOD DISPENSING SYSTEM

FIELD OF THE INVENTION

The present invention relates to bulk dispensing systems for dry foods, and more particularly to a system for dispensing a predetermined quantity of a breakfast cereal from a hermetically sealed reservoir without breakage of the individual cereal pieces.

BACKGROUND OF THE INVENTION

In private homes, ready-to-eat breakfast cereal is generally either stored in the box in which it was purchased or transferred to a sealed container for storage. The consumer then transfers the desired amount of cereal to his serving bowl by pouring or scooping.

Hotels, restaurants, residential institutions and other establishments in which breakfast buffets are available frequently present breakfast cereals in large bowls to which the consumer may help himself using a scoop. There are many disadvantages associated with these storage and dispensing arrangements.

Firstly, spillage frequently occurs during transfer of the cereal from the storage bowl to the consumer's bowl, causing wastage and mess.

Secondly, freshness is not preserved. If cereal is stored in its original box, no air-tight seal is provided and the cereal at the bottom of the box may become stale before consumption. In the case of the storage bowl or container, no continual flow of fresh product is maintained, since the bowl or container may be repeatedly refilled from above, resulting in stale cereal remaining at the bottom.

Thirdly, these methods are unhygienic, since the food is exposed to contamination by dust, insect matter and other airborne particles. Such contamination may occur even if the box is closed or a cover is provided, since each consumer must remove the cover prior to helping himself to cereal. Furthermore, the cereal may inadvertently be touched by the consumer during the scooping process.

Fourthly, crushing of the cereal frequently occurs during scooping, resulting in product wastage.

Various solid food devices comprising an enclosed reservoir with an attached dispensing mechanism have been developed to alleviate the problems associated with unsanitary storage and dispensing methods.

However, most of the known bulk food dispensers are suitable for food comprising hard pieces, such as beans or hard candies, but cause considerable breakage and crushing of fragile foods such as breakfast cereals. Dispensers which have been described as being suitable for breakfast cereals have a tendency to become jammed. Furthermore, the majority of conventional dispensers are extremely hard to clean efficiently, resulting in a non-hygienic food dispensing system, or requiring considerable time and effort to be regularly invested in cleaning the system.

In addition, conventional systems do not provide hermetic sealing of the cereal in the storage section of the dispenser, therefore do not ensure freshness of the product.

It would therefore be desirable to provide a closed, hygienic dispensing system for ready-to-eat cereals which does not cause breakage of the product, which provides hermetic sealing of the product within a storage area prior to dispensing, and which is simple to refill and maintain.

SUMMARY OF THE INVENTION

Accordingly, it is an object of the present invention to overcome the disadvantages of the prior art and provide a cereal dispenser which causes minimal breakage of the product, in which the components of the system may be quickly and easily disassembled for cleaning and in which the cereal is hermetically sealed in a storage section until required.

In accordance with a preferred embodiment of the present invention there is provided a dispenser for a granular product comprising a container which can be filled with the product and a flexible paddle wheel fixed within the container. The paddle wheel has measuring compartments for measuring and dispensing a predetermined amount of the product. The dimensions of the paddle wheel are such that the wheel forms a hermetic seal near one end of the container. A lid is provided to seal the upper end of the container, so that the product is stored in an air-tight compartment prior to dispensing.

According to a preferred embodiment of the present invention, there is provided a system for measuring and dispensing predetermined amounts of a granular product, comprising a refillable, hermetically sealable receptacle provided with an open lower end and containing a quantity of the product, and a rotatable and flexible device provided within a lower end of said receptacle for measuring and dispensing the predetermined quantity of the product.

A feature of the present invention is the provision of a system for maintaining a ready-to-eat cereal under hermetically-sealed conditions prior to dispensing of the cereal without breakage of the cereal pieces.

An advantage of the present invention is that minimal breakage of the cereal pieces occurs.

A further advantage of the present invention is that the cereal is stored in a hermetically-sealed container prior to dispensing, maintaining product freshness.

A further advantage of the present invention is that the components of the system can be quickly and easily disassembled for cleaning.

A further advantage of the present invention is that the system is easy to fill and maintain.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

Figure 1:
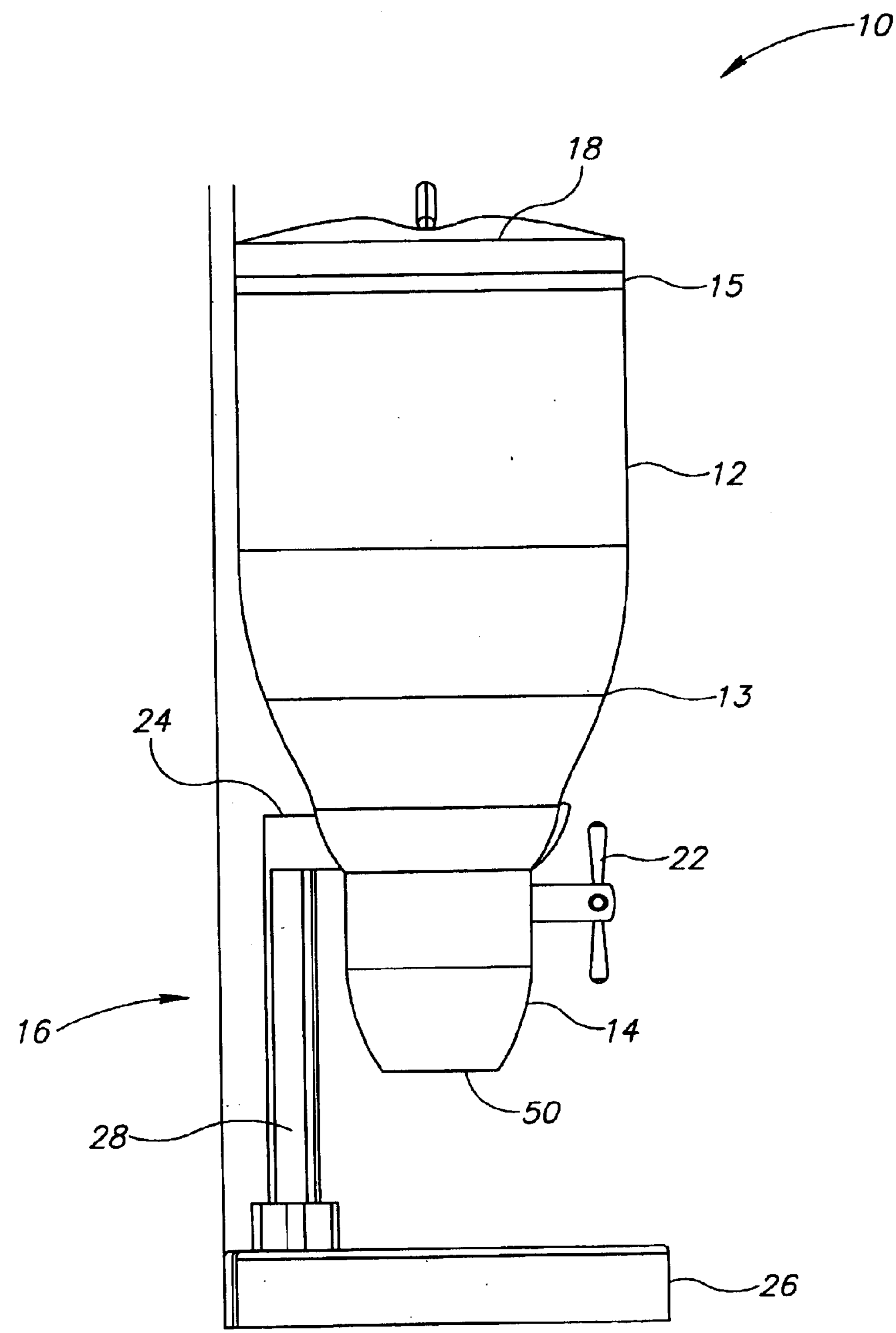
FIG. 1 shows the cereal dispensing system of the present invention.

Referring now to FIG. 1, there is shown a dry food dispensing system 10, constructed and operated in accordance with the principles of the present invention, for use in dispensing breakfast cereals. System 10 comprises a reservoir 12 for containing breakfast cereal, provided at its base with a funnel 14, and supported by a stand 16. Within funnel 14 is provided a dispensing mechanism 20 (shown in FIG. 2), operated by a handle 22.

Reservoir 12 has an open lower end 13, and an upper end 15 which is sealed by a removable lid 18. Lid 18 minimizes contamination by airborne particles and may be easily removed for refilling of reservoir 12 with cereal. Reservoir 12 may comprise a transparent material, enabling the contents of the reservoir to be viewed by the consumer.

Stand 16 comprises an upper horizontal arm 24, to which funnel 14 is removably attached, a base 26 and a vertical portion 28 to maintain a spaced relationship between base 26 and arm 24. A bowl (not shown) may be positioned on base 26 to receive a predetermined quantity of cereal.

Figure 2:
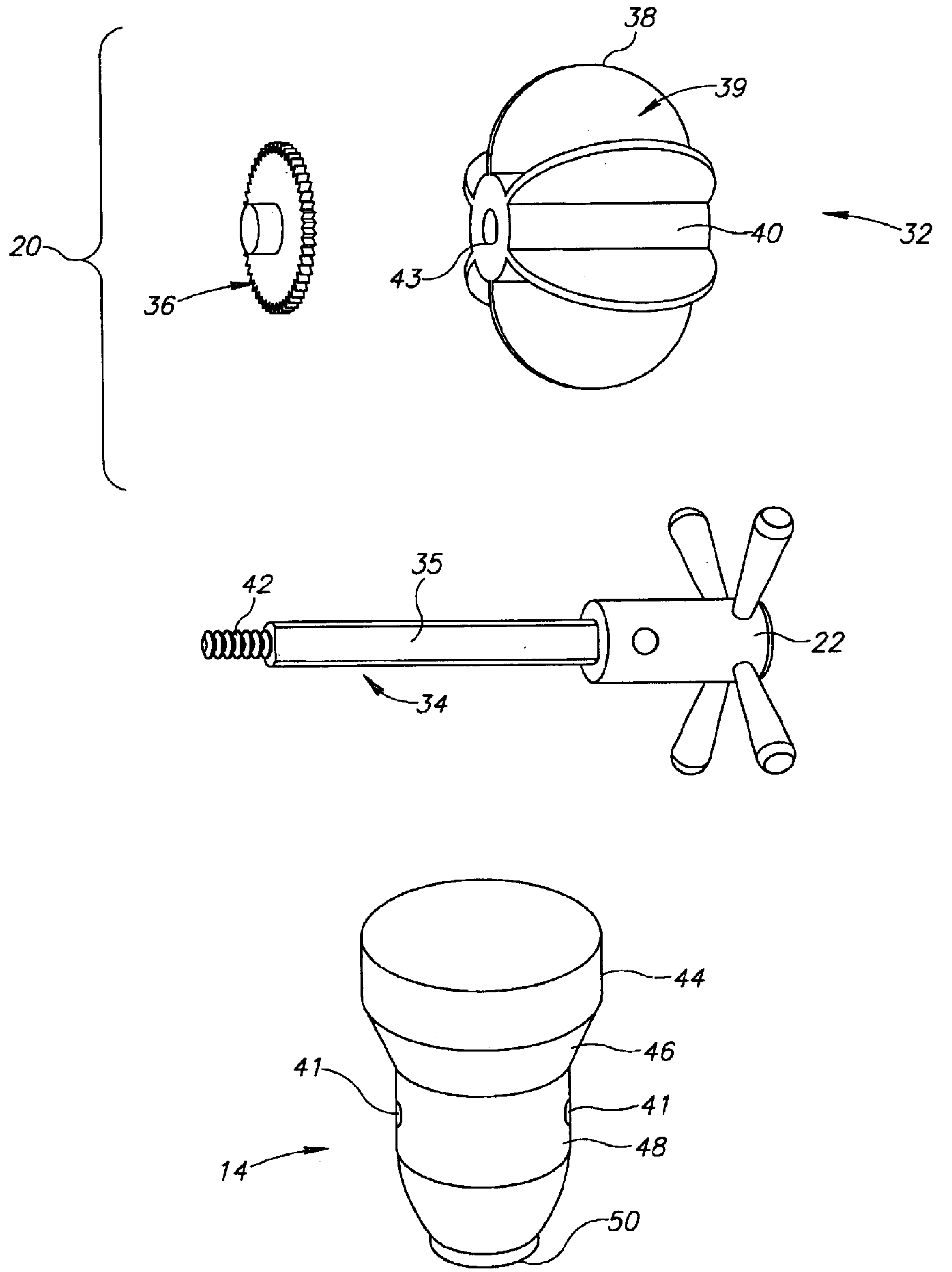
FIG. 2 shows an exploded view of the cereal dispensing system of FIG. 1.

Referring now to FIG. 2, dispensing mechanism 20 is shown. Mechanism 20 comprises a paddle wheel 32, a shaft 34 provided with a handle 22, and a plastic nut 36.

Paddle wheel 32 comprises a plurality of semicircular flexible paddles 38 radiating outwards from a hollow central core 40. Core 40 is shaped as an elongated cylinder with a flat side 43, and is open at each end. A dispensing compartment 39 is formed between each pair of adjacent blades 38. Paddle wheel 32 is formed from silicone rubber or similar material, having suffient flexibility to prevent breakage of the cereal pieces.

Funnel 14 comprises a wide mouth portion 44, a central tapering section 46, and a lower neck portion 48 having an open lower end, providing a dispensing aperture 50. The diameter of dispensing aperture 50 is identical to that of wheel 32. Neck 48 is provided with a pair of diametrically opposite through holes 41.

Shaft 34 comprises an elongated cylinder having a flat side 35. Shaft 34 is provided at one end with a handle 22 and at its other end with a threaded arrangement 42. Handle 22 may be formed from plastic, metal or other suitable material.

Figure 3A:
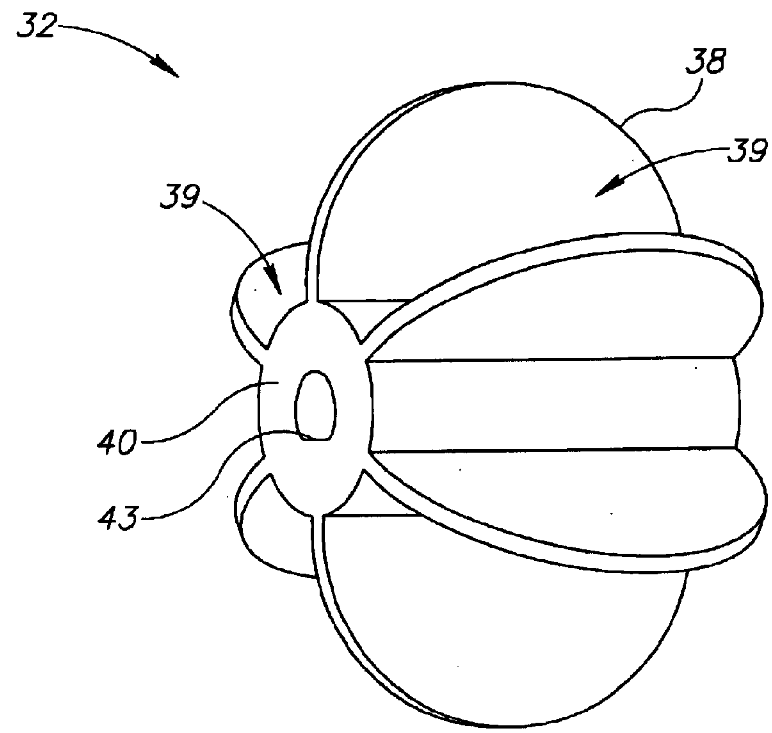
FIGS. 3*a* and 3*b* show a perspective and front view respectively of a component of the dispensing system of FIG. 1.

Referring now to FIGS. 3*a* and *b*, paddle wheel 32, comprising a series of flexible blades 38 attached to a central core 40, is shown. The serving compartments 39 formed between adjacent blades 38 may be clearly seen.

Figure 3B:
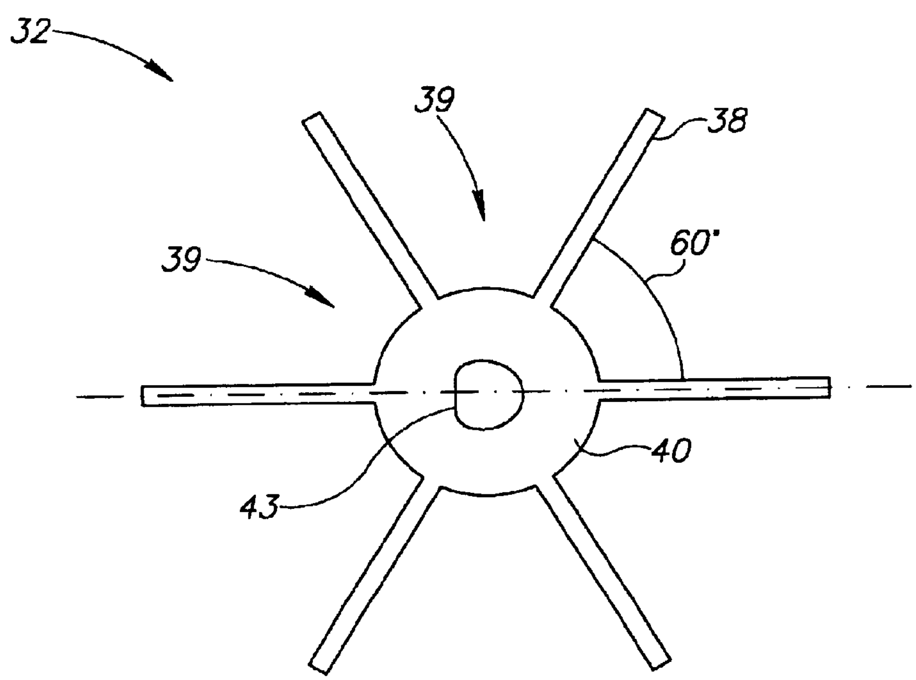

The optimal size of paddle wheel 32 depends on the average size of the individual food pieces being dispensed. In the preferred embodiment of the dispensing system 10 of the present invention, in which the food being dispensed is a breakfast cereal, the optimal diameter of wheel 32 has been found to be 80 mm. In system 10, wheel 32 comprises six blades 38, arranged with identical angles between each pair of adjacent blades 38, such that each angle is 60 degrees, as shown in FIG. 3*b*.

System 10 may be adapted for use in dispensing dry food other than breakfast cereal by increasing or decreasing the angle between adjacent paddles 38 in order to regulate the serving portion dispensed. Providing wheel 32 with a larger number of paddles 38 will therefore decrease the angle between blades, resulting in smaller serving portions, making the system suitable for dispensing coffee powder, soup almonds, etc.

Figure 4:
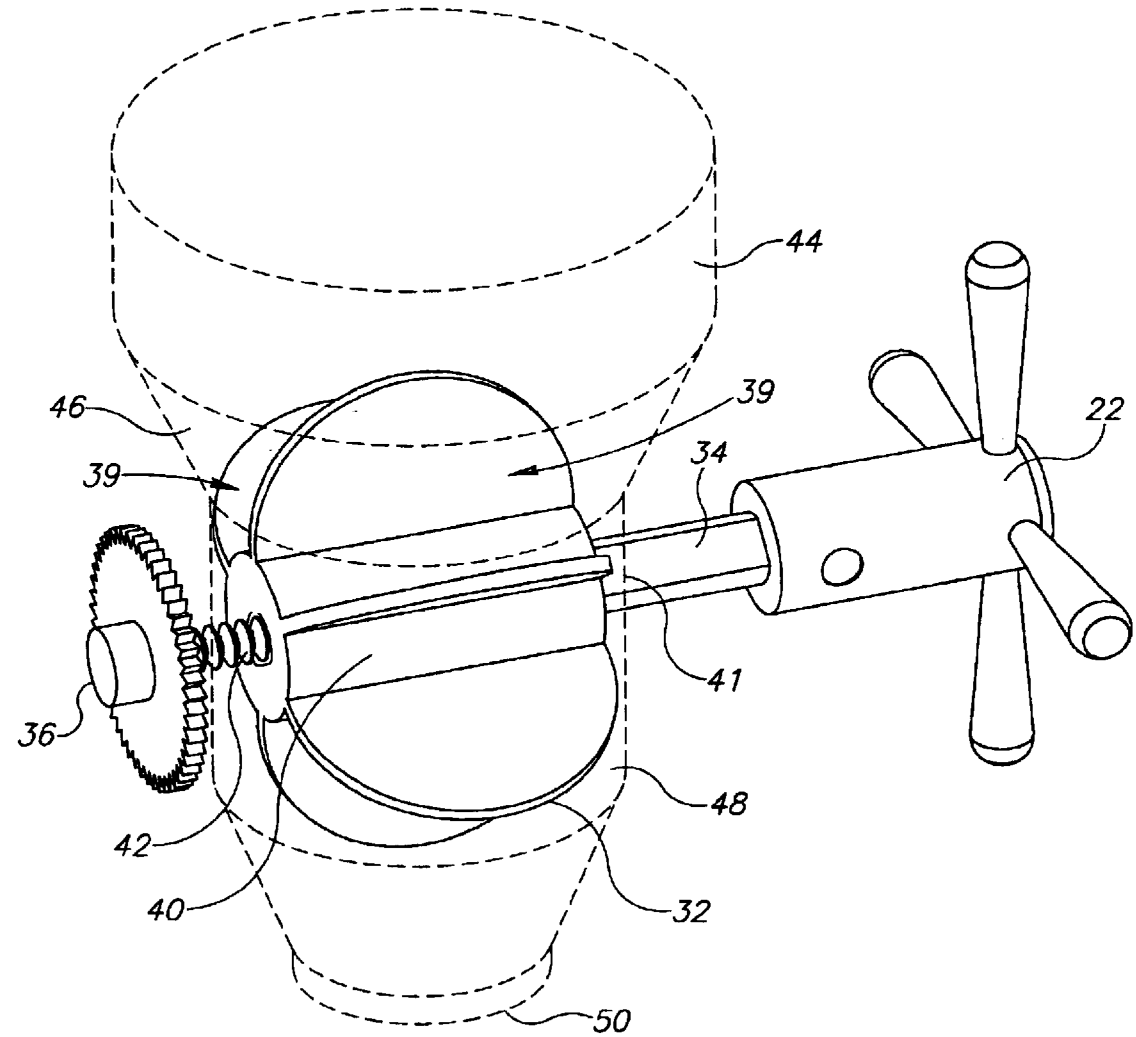
FIG. 4 shows the assembled components of the mechanism of FIG. 2.

Referring now to FIG. 4, in order to assemble system 10, paddle wheel 32 is positioned in neck 48 of funnel 14 with the open ends of hollow core 40 aligned with the through holes 41 formed in neck 48. Shaft 34 is inserted into one through hole and core 40, with the flat side 43 of core 40, and such that threaded end 42 protrudes slightly through the far end of core 40. Shaft 34 may then be fixed in position by screwing plastic nut 36 onto threaded end 42.

Following assembly of system 10, lid 18 of reservoir 12 may be removed and reservoir 12 tilled with the cereal to be dispensed. Lid 18 is then replaced to seal system 10 from above. Silicone rubber paddle wheel 32, having diameter identical to that of dispensing aperture 50 of funnel 44, provides hermetic sealing of aperture 50, maintaining the hygiene and freshness of the contents of system 10.

Compartment 39 is positioned facing upwards to receive food from reservoir 12, so that on filling of reservoir 12, cereal passes through the lower end of reservoir 12, into funnel 44, and thereafter into compartment 39. Handle 22 may then be turned to rotate wheel 32, such that this rotation causes alignment of compartment 39*a* with open end 13 of reservoir 12, and subsequent filling of compartment 39*a*. Handle 22 is further turned in the same direction until a filled compartment 39 becomes aligned with dispensing aperture 50 of funnel 14. Cereal is thereby discharged into a receptacle positioned below dispensing aperture 50.

System 10 may be easily disassembled by unscrewing nut 36, removing shaft 34 and wheel 32. Each component may be washed using conventional detergents.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A system for measuring and dispensing a predetermined quantity of a granular product, comprising:

a refillable, hermetically sealable receptacle having a funnel with a neck, said neck being provided with an open lower end formed as a dispensing aperture, said receptacle containing a quantity of the granular product; and a rotatable and flexible paddle wheel means provided within said neck, for measuring and dispensing the predetermined quantity of the granular product, wherein the diameter of said paddle wheel means is identical to that of said neck, providing hermetic sealing of said neck for maintaining the hygiene and freshness of the granular product;

wherein said paddle wheel means comprises a hollow central core and a plurality of curved, silicone rubber paddles extending radially outwards therefrom to define spaces therebetween, wherein each of said spaces between adjacent paddles provides a measuring cavity, wherein a first end of a shaft extends through said hollow core of said paddle wheel means beyond a first through-hole formed in said neck of said funnel, said first end being provided with retaining means to retain said shaft within said first through-hole, and wherein a second end of said shaft extends beyond a second through-hole formed in said neck of said funnel, positioned diametrically opposite said first through-hole, said second end further comprising a handle for turning said shaft to rotate said paddle wheel means, said handle being situated on a front side of said neck for direct access thereto, said system further comprising a support stand comprising a base, a vertical section upwardly extending from said base, and a horizontal retaining arm extending outward from said vertical section, said horizontal retaining arm removably receiving said receptacle therein, said system being capable of easy disassembly for cleaning, wherein when said handle rotates said paddle wheel means, the granular product is dispensed substantially without breakage via said dispensing aperture.

2. The system of claim 1 wherein said paddle wheel means comprises a plurality of measuring cavities, wherein rotation of said paddle wheel means brings a first of said measuring cavities into an upwardly facing position such that said cavity is filled with the granular product contained within said receptacle, and such that further rotation of said paddle wheel means brings said cavity opposite said dispensing aperture, thereby dispensing the predetermined quantity of the granular product.

3. The system of claim 1 wherein said funnel comprises an upper outwardly-tapering portion having said neck extending downwardly therefrom, and wherein said paddle wheel means is positioned within said neck.

4. The system of claim 1 wherein said receptacle is provided with an upper lid.

5. The system of claim 1 wherein said paddle wheel means comprises six paddles.

6. The system of claim 1 wherein the diameter of said paddle wheel means is 80 mm.

7. The system of claim 6 for use as a cereal dispenser.

8. A method for measuring and dispensing a granular product comprising the steps of:

providing a measuring and dispensing system comprising:

a refillable, hermetically sealable receptacle having a funnel with a neck, said neck being provided with an open lower end formed as a dispensing aperture, said receptacle containing a quantity of the granular product; and a rotatable and flexible paddle wheel means provided within said neck, for measuring and dispensing a predetermined quantity of the granular product, wherein the diameter of said paddle wheel means is identical to that of said neck, providing hermetic sealing of said neck for maintaining the hygiene and freshness of the granular product, wherein said paddle wheel means comprises a hollow central core and a plurality of curved, silicone rubber paddles extending radially outwards therefrom to define spaces therebetween, wherein each of said spaces between adjacent paddles provides a measuring cavity, wherein a first end of a shaft extends through said hollow core of said paddle wheel means beyond a first through-hole formed in said neck of said funnel, said first end being provided with retaining means to retain said shaft within said first through-hole, and wherein a second end of said shaft extends beyond a second through-hole formed in said neck of said funnel, positioned diametrically opposite said first through-hole, said second end further comprising a handle for turning said shaft to rotate said paddle wheel means, said handle being situated on a front side of said neck for direct access thereto, supporting said system in an elevated orientation via a support stand comprising a base, a vertical section upwardly extending from said base, and a horizontal retaining arm extending outward from said vertical section, said horizontal retaining arm removably receiving said receptacle therein, said system being capable of easy disassembly for cleaning, inserting a receiving bowl beneath said dispensing aperture;

filling said refillable receptacle with the granular product;

rotating said paddle wheel means such that said spaces between said paddles are filled with the granular product; and further rotating said paddle wheel means to dispense the predetermined quantity of the granular product substantially without into said receiving bowl via said dispensing aperture.

* * * * *